3,129,142
FUEL ELEMENT
Warren P. Chernock, West Hartford, Conn., assignor to Combustion Engineering, Inc., New York, N.Y., a corporation of Delaware
No Drawing. Filed Mar. 31, 1959, Ser. No. 803,074
2 Claims. (Cl. 176—69)

This invention relates to fuel elements for a nuclear reactor and has particular relation to an improved element wherein the fuel is a ceramic diluted with another ceramic of low neutron absorption cross section.

It is an object of this invention to provide an improved ceramic fuel element which can be operated at high burnups.

Fuel elements for nuclear reactors may be in a variety of forms or shapes but they all are formed of a fuel material or insert covered with an outer protective coating or casing which, for example, can be zirconium, aluminum, stainless steel or their alloys. These elements are positioned in relatively closely spaced relation in the core of the reactor to form a critical mass and a cooling or heat absorbing medium flows about the elements and through the passages therebetween to carry away the heat generated by fission of the fuel. Since fuel elements employing ceramic fuel materials may be operated for a longer time, or, in other words, with higher burnups and at higher temperatures than metallic fuel elements, these fuel elements employing ceramic fuel materials have become of particular importance in connection with reactor cores that are designed to have long operating lives. Prior ceramic fuel element designers have utilized a uranium compound, such as $UO_2$, interposed or dispersed in a matrix of ceramic of low absorption cross section, as, for example, $Al_2O_3$, in the form of a mechanical heterogeneous mixture. In this mixture discrete particles of the uranium compound are dispersed throughout the ceramic matrix. This ceramic mixture forms the fuel material and is encased in a suitable casing or cladding as is conventional and well known. During operation, voids in the $UO_2$ lattice are filled with fission fragments. When all voids are filled with fission fragments cracks will be formed in the $UO_2$ particles and these cracks will propagate through the ceramic matrix causing an increase in free surface are and thus resulting in increased fission gas release. Fission gases will pass along these cracks and collect in particular places with these collections of gas building up internal pressure on the outer metal casing of the element. This, in turn could distort the element and restrict the flow of cooling fluid through the reactor core at this location which will cause overheating and eventual destruction of the element. In addition, the collection of low conductivity fission gases in critical regions of the fuel element will decrease the thermal efficiency of the element as a whole and could cause internal melting with gross release of fission gases which would then accelerate the foregoing effects of fission gas release. Thus, as a result of the discrete fuel particles dispersed throughout the element which form concentrations of fissionable material, the limit of burnup is determined by the occurrence of the above effects with the burnup at which these effects occur being referred to as the "critical" burnup in the element.

In lieu of employing a mechanical mixture of discrete $UO_2$ particles in a low cross section ceramic as the fuel material of the element, the present invention involves the use of a solid solution of $UO_2$ in particular, low cross section ceramics, to wit, $CeO_2$ and stabilized $ZrO_2$. These particular ceramics are ideally suited for this purpose with both $CeO_2$ and stabilized $ZrO_2$ having face centered crystalline forms so that they may form a solid solution with the face centered crystalline form of $UO_2$. It will be appreciated that in order to form a solid solution the crystalline forms must be the same and since $UO_2$ is of the face centered crystalline form the ceramics employed to form a solid solution therewith must have this same crystalline formation. $CeO_2$ is additionally well suited in that it has a low neutron absorption cross section and forms a solid solution of $UO_2$ over wide composition ranges. $ZrO_2$ is also additionally well suited since it may be stabilized in the face centered cubic form so a solid solution may also be formed over a wide range of compositions, with stabilized $ZrO_2$ also having a low neutron absorption cross section. $ZrO_2$ may be stabilized in the face centered cubic form by small additions of oxides of calcium, magnesium and yttrium. Solid solutions of both $CeO_2$ and $ZrO_2$ are had throughout the range of percentages required for a satisfactory fuel element, i.e., where the range of $UO_2$ in the solid solution varies from about 5 m/o to about 55 m/o. Face centered cubic $ZrO_2$ is extremely stable under radiation as is evidenced by the fact that unstabilized monoclinic $ZrO_2$ reverts to the face centered cubic $CaF_2$ structure during exposure to fast neutrons. Thus the $UO_2$-stabilized $ZrO_2$ solution would be stable under radiation and it is also stable at room temperatures and the operating temperatures within a reactor.

It will be appreciated that a solid solution of these ceramics, i.e., $UO_2$ in either $CeO_2$ or $ZrO_2$, involves having the atoms in a given lattice structure include both zirconium and uranium atoms or cerium and uranium atoms such that the distribution of atoms is homogeneous as contrasted with the heterogeneous mixture mentioned hereinbefore wherein discrete particles of $UO_2$ are disposed in a ceramic matrix.

With this fuel system employing a solid solution fuel material there is little or no cracking in the element (caused by radiation damage as distinguished from that which would occur due to thermal stress, the latter effect being minimized for highly enriched systems due to imposed geometry considerations) or dimension change in the element until all voids in the solid solution lattice are filled with fission fragments ("critical" burnup). This is in contrast to the aforementioned heterogeneous system wherein only the voids in the lattice of the $UO_2$ (and a localized region around the $UO_2$ corresponding to the fission fragment range and including density voids within this range are filled with fission fragments.

Thus the critical burnup values for the heterogeneous and homogeneous $UO_2$ systems are roughly inversely proportional to the ratio of the total number of molecules to $UO_2$ molecules. Accordingly it is evident that with the $UO_2$ solid solution systems a substantially greater percentage of burnup may be had than in the previously proposed ceramic fuel systems.

It is understood that this description is illustrative of the invention and the invention is restricted only in accordance with the scope of the appended claims.

What is claimed is:

1. A fuel element comprising a protective casing, a fuel within said casing that is a homogeneous face centered cubic solid solution of from 5 mole percent to 55 mole percent $UO_2$ in stabilized $ZrO_2$.

2. The organization of claim 2 wherein the $ZrO_2$ is stabilized in the face centered cubic crystalline formed by small additions of an oxide selected from the group consisting of calcium, magnesium and yttrium.

References Cited in the file of this patent
FOREIGN PATENTS
754,559    Great Britain _____ Aug. 8, 1956
(Other references on following page)

OTHER REFERENCES

KAPL–1918, April 4, 1958.
LA–2138, November 15, 1957.
BMI–1117, July 24, 1956.
WAPD–PWR–PMM–904, Belle and Jones, December 3, 1956, pages 10, 11, 78–81.
AEC document, TID–7546, book 2, Fuel Element Conference, November 18–23, 1957, page 560.
AEC document, WAPD–TM–73, August 15, 1957, pages 21–22 and 70–72.
AEC document, ANL–5053, received in Lib. December 19, 1956, page 16.
AEC document, WAPD–PWR–PMM–904, December 3, 1956, pp. 10–11.
AEC document, WAPD–MRP–68, received August 5, 1957, page 82.